May 29, 1934.  H. KOESTER  1,960,675
STRETCH COMPARATOR
Filed Sept. 22, 1932   2 Sheets-Sheet 1

INVENTOR
HERMAN KOESTER
BY
ATTORNEY

May 29, 1934.                 H. KOESTER                  1,960,675
                          STRETCH COMPARATOR
              Filed Sept. 22, 1932            2 Sheets-Sheet 2
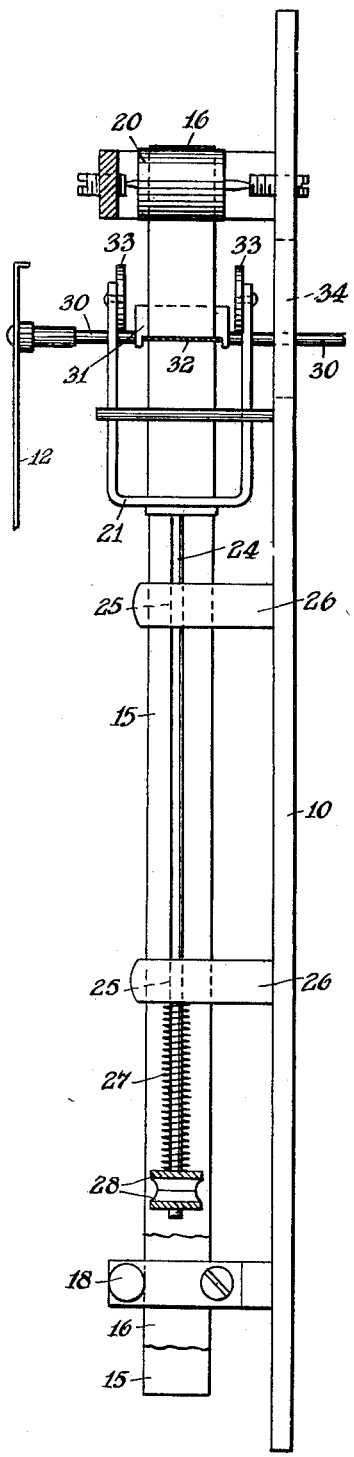
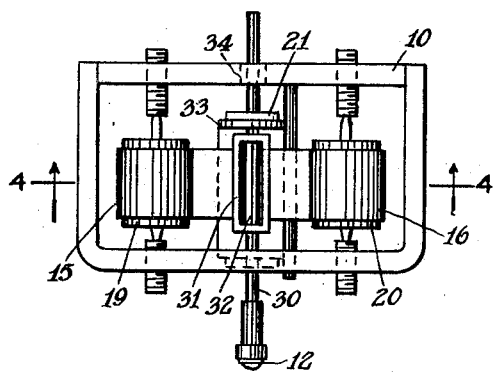
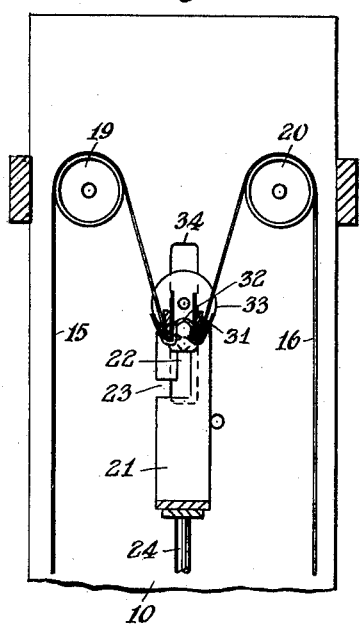
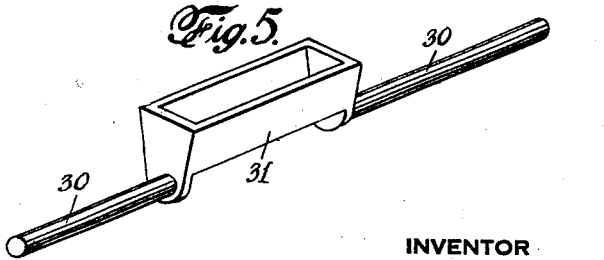
INVENTOR
HERMAN KOESTER
BY
ATTORNEY Patented May 29, 1934

1,960,675

UNITED STATES PATENT OFFICE 1,960,675

STRETCH COMPARATOR

Herman Koester, Waterbury, Conn., assignor to The Bristol Company, Waterbury, Conn., a corporation of Connecticut Application September 22, 1932, Serial No. 634,351

10 Claims. (Cl. 73—51)

The invention relates to measuring apparatus, and more particularly to devices whereby the effect of humidity changes upon material such as paper, cloth, etc., may be ascertained. As is well understood, for certain purposes paper, for example, is required to possess a minimum stretch, particularly in its application as recording charts whose accuracy is proportional to the quality of the paper in this respect. It has been the practice, therefore, to make laboratory tests in checking the grade of the papers employed, but this involves a more or less laborious and time-consuming procedure.

The present invention has for an object the provision of a device whereby different grades of paper or like material may readily and rapidly be checked against a standard sample previously ascertained to meet the user's requirements.

In carrying out the invention, a standard sample of known stretch is cut into a strip of suitable length and width and is opposed in the novel device to a similar strip of the material under test, both strips being subjected in the device to a humidity change, that is to say to a different percentage of moisture than that at which the standard was normalized. Any difference in stretch or shrinkage between the two strips is caused to be reproduced as a differential movement which is measured or indicated in any convenient manner, and as is well understood in the art.

The nature of the invention, however, will best be understood when described in connection with the accompanying drawings, in which:

Fig. 2 is a side elevation thereof on an enlarged scale and with the upper portions shown in vertical section.

Fig. 3 is a fragmentary plan view.

Fig. 4 is a fragmentary vertical section, taken on the line 4—4, Fig. 3.

Fig. 5 is a perspective view of the arbor member.

Figure 1:
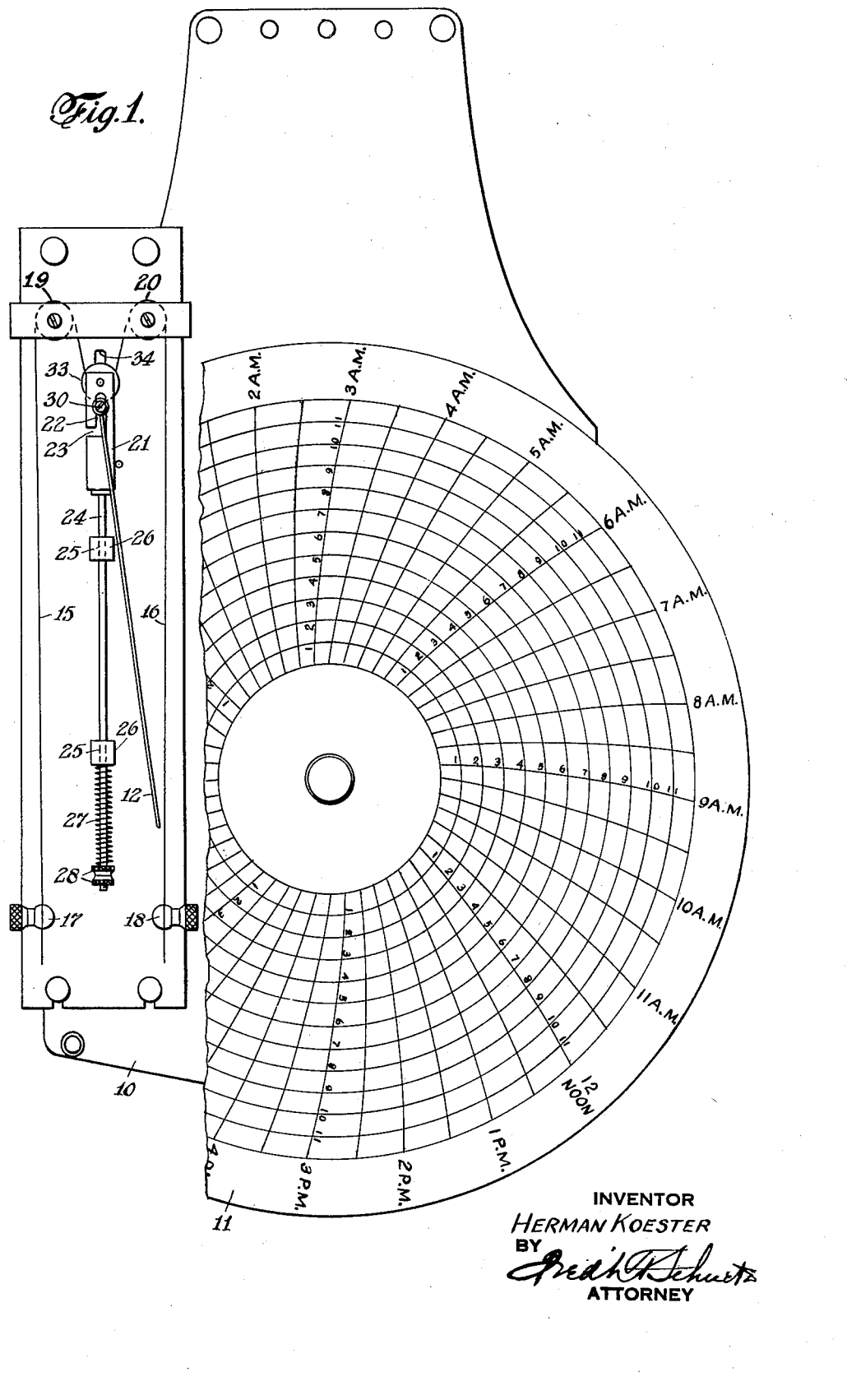
Fig. 1 is a front elevation of the novel comparator device, with a portion of the recording chart broken away.

Referring to the drawings, 10 designates a suitable backing plate or frame member for carrying and supporting the various elements constituting the novel comparator device. At the lower portion, for example, of this frame is rotatably supported a record chart 11 upon which a record may be effected in well known manner by the pointer or measuring arm 12. For more refined determinations, it is preferred to provide the record surface upon a chart constituted as a metal disk with smoked film surface to reduce the pointer friction to a minimum and to obviate the effects of moisture upon chart material such as the usual paper employed.

As hereinbefore noted, a strip 15 of paper or like material of allowable standard stretch or shrinkage and a test strip 16 are prepared in the required lengths, for example, from 10" to 11" and of a width of approximately ½", being cut with the grain of the paper running at right angles to the length of the strip. One end of each of these strips is then anchored firmly in the apparatus, for example, in the respective clamping posts 17 and 18, and the strips are brought about suitable guide rollers 19 and 20 which are displaced from the said posts and secured to the frame at its upper portion as shown. The free ends of the strips, however, are designed to be connected to a carriage member embodying a bifurcated element 21 having longitudinal slots 22 in its tines and communicated with entrance slots 23. A rod 24 extends downwardly from the tines and is guided for longitudinal movement in suitable bearings 25 at the outer ends of uprights or standards 26 secured to the frame.

A spring 27, about the lower end of the rod and located between one of the standards and adjustable nuts 28 on the rod, serves to draw the rod and tines downwardly or toward the said posts substantially parallel to the strips. When the free ends of the strips are connected to the said carriage member as hereinafter set forth, said strips will thus be duly tensioned by the spring 27; and the desired tension may be secured by setting the nuts 28 accordingly.

To this end there is arranged to be reciprocably mounted in the slots 22 an arbor member which is also rotatable therein. This member comprises trunnions 30 which extend through the said slots 22 and are connected to intermediate knife-edge portions 31 which are offset or displaced laterally from the axis of rotation of the arbor and to equal distances therefrom. The free ends of the two strips are to be brought over the respective knife-edges and are adapted to be removably held thereto, as by means of a spring clamp 32 snapped over the opposite sides of the knife-edges (Fig. 4).

Due to the tension provided by the spring 27 upon the carriage member, said member as a whole will be drawn toward the anchored ends of the strips while the free ends thereof attached to the arbor member will also be subjected to the tension through contact of its trunnions with respective tines, or rather, with the periphery of rollers 33 carried by the outer ends of the tines and which thus serve to reduce the friction upon the said trunnions and enhance rotation of the arbor. To facilitate the attachment of the free ends of the two strips to the arbor, the same is arranged to be removable from the carriage member as through the entrance slots 23; and after said ends have been properly secured by means of the clamp 32, the arbor is returned to the carriage as in passing the trunnions through the entrance slots and into engagement with the rollers 33, and one of the trunnions extending through a guide slot 34 of the back plate.

A suitable measuring element such as the pointer or recording arm 12 is secured to the other of the trunnions 30 so that any rotational movement of the arbor will be reproduced as a corresponding angular movement of the said pointer to serve as a measure of the differential effect produced by different stretching of the two strips under humidity variations. It will be understood that both strips have been seasoned to the same relative humidity and that the pointer has previously been set on some arbitrary zero line of the chart, as, for example, in the middle of the field. If both strips then stretch alike, there will, of course, be no resultant movement of the pointer; but said pointer will trace a record upon one side or the other of the zero line where the paper strips do not react similarly, and in accordance with the differential of their respective effects.

By the foregoing arrangement, determination of the grade of a paper with respect to stretch or shrinkage is facilitated after a standard has once been selected; and the floating and removable mounting of the arbor expedites the test operations and allows also of ready adjustment of the initial tension upon both the standard and the sample under test.

I claim:

1. A stretch comparator, comprising a rigid frame including a pair of clamping posts to anchor respectively an end of each of a pair of strips of material subject to stretch under humidity changes of the surrounding atmosphere, means displaced from the posts upon said frame and over which the respective strips are adapted to pass, a carriage yieldingly secured to the frame, an arbor rotatably mounted therein, means to secure the free ends of the said strips to the arbor respectively upon opposite sides of its axis of rotation and at a distance from its axis of rotation, whereby unequal stretching of the said strips will be reproduced in an angular movement of the said arbor proportional to the differential of the stretches, and means to indicate the degree of rotation of the arbor.

2. A stretch comparator, comprising a rigid frame including a pair of clamping posts to anchor respectively one end of each of a pair of strips of material subject to stretch under humidity changes of the surrounding atmosphere, a pair of guide rollers displaced from the posts upon said frame and over which the respective strips are adapted to pass, a carriage yieldingly secured to the frame between the clamping posts and guide rollers, an arbor rotatably mounted therein, means to secure the free ends of the said strips to the arbor respectively upon opposite sides of its axis of rotation and at a distance from its axis of rotation, whereby unequal stretching of the said strips will be reproduced in an angular movement of the said arbor proportional to the differential of the stretches, and means to indicate the degree of rotation of the arbor.

3. A stretch comparator, comprising a rigid frame including a pair of clamping posts to anchor respectively an end of each of a pair of strips of material subject to stretch under humidity changes of the surrounding atmosphere, means displaced from the posts upon said frame and over which the respective strips are adapted to pass, a carriage yieldingly secured to the frame and constrained to move substantially parallel to the said strips, an arbor rotatably mounted therein, means to secure the free ends of the said strips to the arbor respectively upon opposite sides of its axis of rotation and at a distance from its axis of rotation, whereby unequal stretching of the said strips will be reproduced in an angular movement of the said arbor proportional to the differential of the stretches, and means to indicate the degree of rotation of the arbor.

4. A stretch comparator, comprising a rigid frame including a pair of clamping posts to anchor respectively an end of each of a pair of strips of material subject to stretch under humidity changes of the surrounding atmosphere, means displaced from the posts upon said frame and over which the respective strips are adapted to pass, an elongated carriage yieldingly secured to the frame, an arbor rotatably mounted in said carriage and adapted to slide therein in the direction of the longitudinal axis of said carriage, means to secure the free ends of the said strips to the arbor respectively upon opposite sides of its axis of rotation and at a distance from its axis of rotation, whereby unequal stretching of the said strips will be reproduced in an angular movement of the said arbor proportional to the differential of the stretches, and means to indicate the degree of rotation of the arbor.

5. A stretch comparator, comprising a rigid frame including a pair of clamping posts to anchor respectively an end of each of a pair of strips of material subject to stretch under humidity changes of the surrounding atmosphere, means displaced from the posts upon said frame and over which the respective strips are adapted to pass, a carriage yieldingly secured to the frame, an arbor movably mounted in said carriage, knife-edges laterally displaced therefrom upon opposite sides of the axis of rotation of said arbor and at equal distances therefrom, and means to clamp the free ends of the said strips over the corresponding knife-edges, whereby unequal stretching of the said strips will be reproduced in an angular movement of the said arbor proportional to the differential of the stretches.

6. A stretch comparator, comprising a rigid frame including a pair of clamping posts to anchor respectively an end of each of a pair of strips of material subject to stretch under humidity changes of the surrounding atmosphere, means displaced from the posts upon said frame and over which the respective strips are adapted to pass, a carriage yieldingly secured to the frame, an arbor movably mounted in said carriage, knife-edges laterally displaced therefrom upon opposite sides of the axis of rotation of said arbor and at equal distances therefrom, and removable means to clamp the free ends of the said strips over the corresponding knife-edges, whereby unequal stretching of the said strips will be reproduced in an angular movement of the said arbor proportional to the differential of the stretches.

7. A stretch comparator, comprising a rigid frame including a pair of clamping posts to anchor respectively an end of each of a pair of strips of material subject to stretch under humidity changes of the surrounding atmosphere, means displaced from the posts upon said frame and over which the respective strips are adapted to pass, a carriage embodying a bifurcated member with longitudinally slotted tines provided with entrance slots, means to mount said carriage upon the frame for movement substantially parallel to the said strips, resilient means urging said carriage in a direction to tension the strips, an arbor slidably mounted in the slots of the bifurcated member and rotatable therein, and means to secure the free ends of the said strips to the arbor respectively upon its opposite sides and at a distance from its axis of rotation, whereby unequal stretching of the said strips will be reproduced in an angular movement of the said arbor proportional to the differential of the stretches.

8. A stretch comparator, comprising a rigid frame including a pair of clamping posts to anchor respectively an end of each of a pair of strips of material subject to stretch under humidity changes of the surrounding atmosphere, means displaced from the posts upon said frame and over which the respective strips are adapted to pass, a carriage embodying a bifurcated member with longitudinally slotted tines provided with entrance slots, means to mount said carriage upon the frame for movement substantially parallel to the said strips, resilient means urging said carriage in a direction to tension the strips, an arbor slidably mounted in the slots of the bifurcated member and rotatable therein, rollers carried by the bifurcated member to engage with the said arbor, and means to secure the free ends of the said strips to the arbor respectively upon its opposite sides and at a distance from its axis of rotation, whereby unequal stretching of the said strips will be reproduced in an angular movement of the said arbor proportional to the differential of the stretches.

9. A stretch comparator, comprising a rigid frame including a pair of clamping posts to anchor respectively an end of each of a pair of strips of material subject to stretch under humidity changes of the surrounding atmosphere, means displaced from the posts upon said frame and over which the respective strips are adapted to pass, a carriage yieldingly secured to the frame, an arbor rotatably mounted therein, a measuring arm connected with the arbor, and means to secure the free ends of the said strips to the arbor respectively upon its opposite sides and at a distance from its axis of rotation, whereby unequal stretching of the said strips will be reproduced in an angular movement of the said arbor proportional to the differential of the stretches.

10. Apparatus of the nature set forth, comprising means to secure at one end a pair of strips of material subject to stretch under humidity changes of the surrounding atmosphere, a movably mounted carriage having an element mounted for angular movement therein and to which the opposite ends of the strips are adapted to be secured at separated points, resilient means urging the carriage in a direction to tension the attached strips, and means associated with the carriage for reproducing the angular movement of the carriage element resulting from differential stretch of the strips.

HERMAN KOESTER.